(12) United States Patent
Hoemann

(10) Patent No.: US 10,742,084 B2
(45) Date of Patent: Aug. 11, 2020

(54) HIGH POWER DENSITY MOTOR HAVING BRIDGED SPOKED ROTOR AND PREWOUND BOBBINS FOR STATOR

(71) Applicant: Nidec Motor Corporation, St. Louis, MO (US)

(72) Inventor: Keith I. Hoemann, Fenton, MO (US)

(73) Assignee: Nidec Motor Corporation, St. Louis, MO (US)

( * ) Notice: Subject to any disclaimer, the term of this patent is extended or adjusted under 35 U.S.C. 154(b) by 362 days.

(21) Appl. No.: 15/634,971

(22) Filed: Jun. 27, 2017

(65) Prior Publication Data

US 2017/0373551 A1    Dec. 28, 2017

Related U.S. Application Data

(60) Provisional application No. 62/355,204, filed on Jun. 27, 2016.

(51) Int. Cl.
*H02K 1/28* (2006.01)
*H02K 3/28* (2006.01)
(Continued)

(52) U.S. Cl.
CPC .............. *H02K 1/28* (2013.01); *H02K 1/146* (2013.01); *H02K 1/2773* (2013.01); *H02K 3/28* (2013.01);
(Continued)

(58) Field of Classification Search
CPC ............ H02K 1/28; H02K 1/146; H02K 3/28; H02K 21/16; H02K 2213/03; H02K 1/2773; H02K 3/345; H02K 2203/12
(Continued)

(56) References Cited

U.S. PATENT DOCUMENTS

| | | | |
|---|---|---|---|
| 6,472,789 B1 * | 10/2002 | Akemakou | H02K 21/042 310/156.49 |
| 2004/0212266 A1 * | 10/2004 | Hans | H02K 1/2766 310/156.56 |

(Continued)

FOREIGN PATENT DOCUMENTS

| | | |
|---|---|---|
| JP | 2011015572 | 1/2011 |
| JP | 2011125106 | 1/2011 |

(Continued)

OTHER PUBLICATIONS

PCT International Search Report and Written Opinion from PCT Application No. PCT/US2017/039572 entitled High Power Density Motor Having Bridged Spoked Rotor and Prewound Bobbins for Stator (dated Sep. 20, 2017).

*Primary Examiner* — Forrest M Phillips
(74) *Attorney, Agent, or Firm* — Hovey Williams LLP

(57) ABSTRACT

A motor includes a stator and a rotor. The rotor is rotatable about an axis. The rotor includes a core including a plurality of pole segments arranged arcuately about the axis. The rotor further includes a plurality of arcuately arranged magnets alternating arcuately with the pole segments, such that each of the magnets is at least in part interposed between a pair of adjacent pole segments. The plurality of pole segments includes a plurality of first-polarity pole segments having a first polarity and a plurality of second-polarity pole segments having a second polarity that is different than the first polarity. The rotor further includes a connecting element connecting at least some of the first-polarity pole segments to one another without connecting the second-polarity pole segments to the first-polarity pole segments.

30 Claims, 10 Drawing Sheets

(51) Int. Cl.
　　　 *H02K 21/16* 　　　(2006.01)
　　　 *H02K 1/14* 　　　(2006.01)
　　　 *H02K 1/27* 　　　(2006.01)
　　　 *H02K 3/34* 　　　(2006.01)
(52) U.S. Cl.
　　　 CPC ............. *H02K 3/345* (2013.01); *H02K 21/16* (2013.01); *H02K 2203/12* (2013.01); *H02K 2213/03* (2013.01)
(58) Field of Classification Search
　　　 USPC .................................................. 310/156.56
　　　 See application file for complete search history.

(56) References Cited

U.S. PATENT DOCUMENTS

| | | | | |
|---|---|---|---|---|
| 2015/0380996 | A1* | 12/2015 | Kim .................... | H02K 1/2773 310/156.56 |
| 2016/0301267 | A1* | 10/2016 | Hoemann .............. | H02K 1/148 |
| 2017/0373551 | A1* | 12/2017 | Hoemann .............. | H02K 21/16 |
| 2018/0091009 | A1* | 3/2018 | Kusase ................ | H02K 1/2773 |
| 2018/0226850 | A1* | 8/2018 | Kim .................... | H02K 1/2773 |

FOREIGN PATENT DOCUMENTS

| | | | | |
|---|---|---|---|---|
| JP | 2011066999 | | 3/2011 | |
| KR | 1020140114583 | | 9/2014 | |
| WO | WO-2013145285 | A1 * | 10/2013 | ............. H02K 21/16 |

* cited by examiner

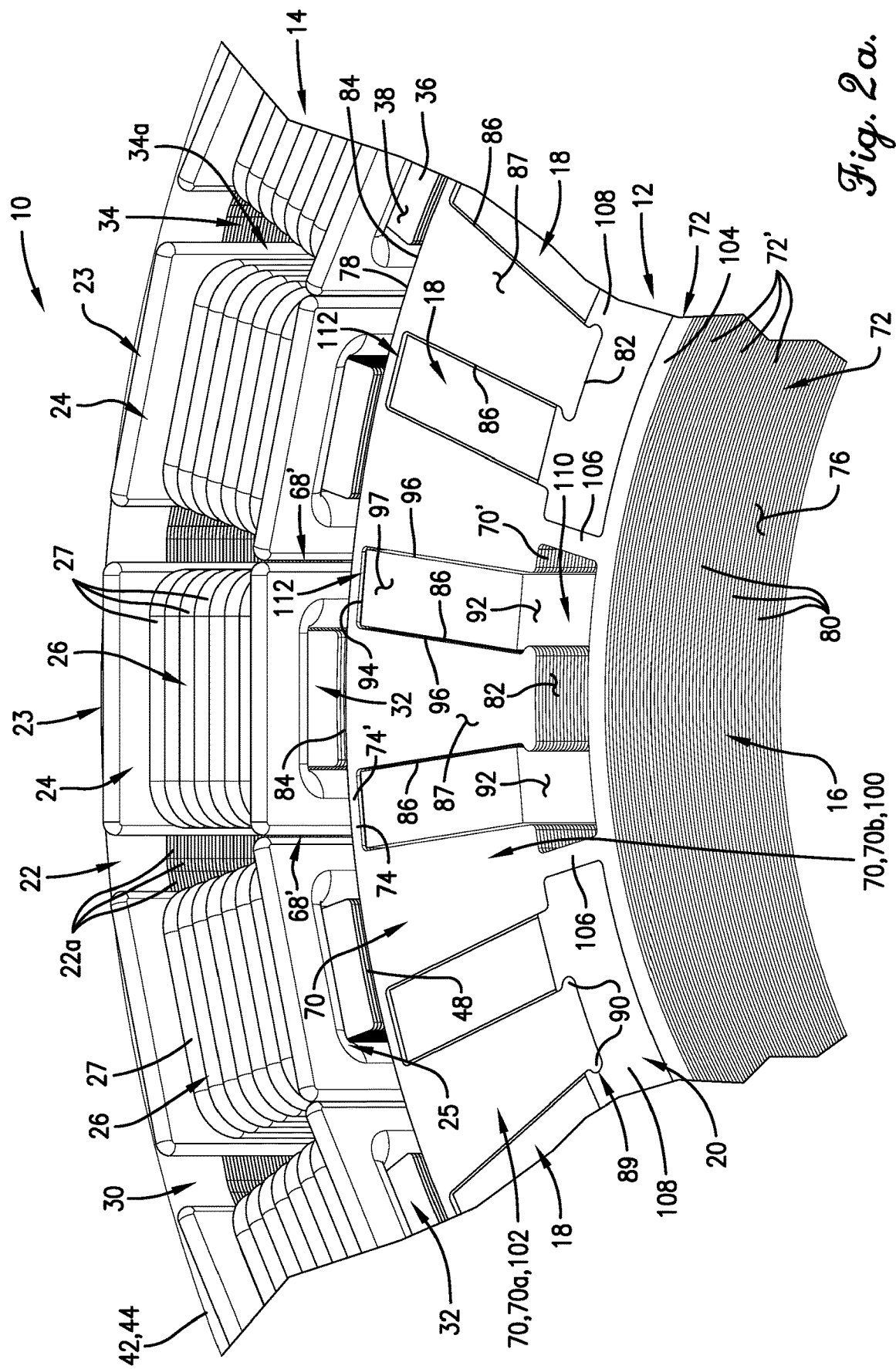

HIGH POWER DENSITY MOTOR HAVING BRIDGED SPOKED ROTOR AND PREWOUND BOBBINS FOR STATOR

CROSS-REFERENCE TO RELATED APPLICATIONS

1. Priority Applications

The present application claims priority from U.S. Provisional Patent Application No. 62/355,204, filed Jun. 27, 2016, and entitled HIGH POWER DENSITY MOTOR HAVING BRIDGED SPOKED ROTOR AND PREWOUND BOBBINS FOR STATOR, the entire disclosure of which is hereby incorporated by reference herein.

BACKGROUND

1. Field

The present invention relates generally to an electric motor. The motor preferably provides high power density and efficient performance while presenting a low weight and a small envelope. The motor additionally preferably requires low manufacturing complexity.

The motor is well-suited for use in any one or more of a variety of applications requiring high power density. Such applications include but are not limited to unmanned aerial vehicles (UAVs), commonly referred to as drones.

2. Discussion of Prior Art

Electric motors conventionally comprise a stator and a rotatable rotor. Such motors may be inner rotor motors, outer rotor motors, or dual rotor motors. Furthermore, a variety of rotor and stator configurations are permissible. The stator might be fly wound or bobbin wound, for instance. The stator tooth geometry may vary according to desired performance characteristics, as well. Among other alternatives, the rotor might comprise a rotor can supporting a plurality of arcuately arranged magnets; a plurality of arcuately arranged magnets alternating with a plurality of arcuately arranged pole segments and fixed via overmolding; or a rotor core with a plurality of magnets arranged arcuately around a perimeter thereof.

SUMMARY

According to one aspect of the present invention, a motor is provided. The motor comprises a stator and a rotor. The rotor is rotatable about an axis. The rotor comprises a core including a plurality of pole segments arranged arcuately about the axis. The rotor further comprises a plurality of arcuately arranged magnets alternating arcuately with said pole segments, such that each of the magnets is at least in part interposed between a pair of adjacent pole segments. The plurality of pole segments includes a plurality of first-polarity pole segments having a first polarity and a plurality of second-polarity pole segments having a second polarity that is different than the first polarity. The rotor further comprises a connecting element connecting at least some of said first-polarity pole segments to one another without connecting said second-polarity pole segments to said first-polarity pole segments.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein:

FIG. 2a is an enlarged, fragmentary perspective view of the motor as shown in FIG. 1, with a portion of the overmolding removed;

Figure 1:
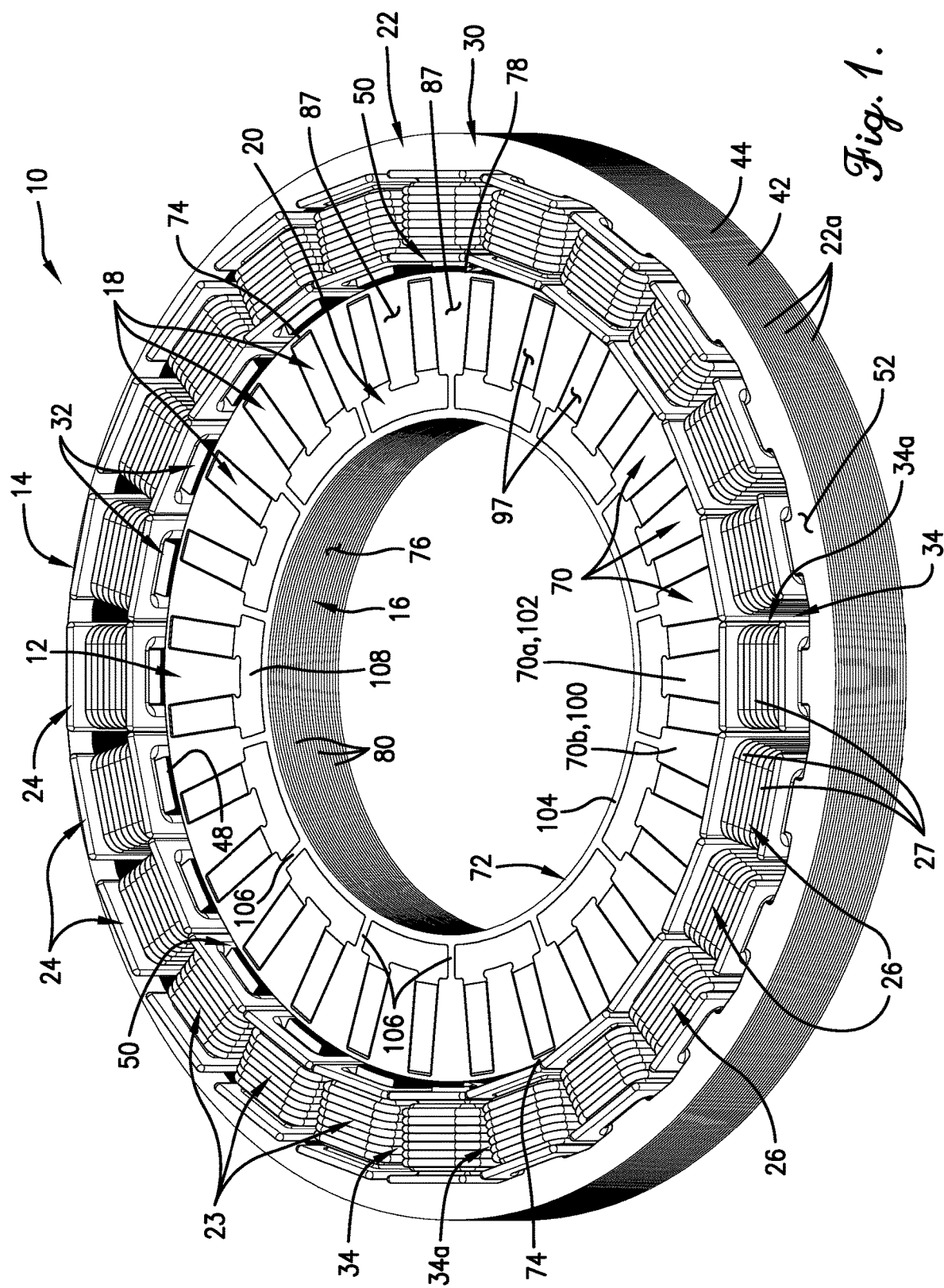
FIG. 1 is a top perspective view of an electric motor in accordance with a first preferred embodiment of the present invention.

The drawing figures do not limit the present invention to the specific embodiments disclosed and described herein. The drawings are not necessarily to scale, emphasis instead being placed upon clearly illustrating the principles of the preferred embodiments.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Furthermore, directional references (e.g., top, bottom, front, back, side, etc.) are used herein solely for the sake of convenience and should be understood only in relation to each other. For instance, a component might in practice be oriented such that faces referred to as "top" and "bottom" are sideways, angled, inverted, etc. relative to the chosen frame of reference.

With initial reference to FIG. 1, an electric motor 10 is provided. As will be discussed in greater detail below, the motor 10 preferably achieves high power density in a cost-effective manner while also maintaining a relatively low overall weight.

The motor 10 includes a rotor 12 rotatable about an axis. The motor 10 further includes a stator 14. The stator 14 preferably at least substantially circumscribes the rotor 12 such that the motor 10 is an inner rotor motor. However, at least some of the inventive features described herein are equally applicable to outer rotor motors and/or dual rotor motors.

Preferably, the motor 10 has a horsepower range between about one (1) hp and about ten (10) hp. More preferably, the horsepower range is between about two (2) hp and about five (5) hp. Most preferably, the horsepower is about two and one half (2.5) hp. Alternatively stated, the motor output power is preferably between about five tenths (0.5) kW and about ten (10) kW. The output power is more preferably between about one (1) kW and about five (5) kW. Most preferably, the output power is about one and nine tenths (1.9) kW. However, higher or lower horsepower motors fall within the scope of some aspects of the present invention.

The motor 10 preferably generates a torque between about one (1) N-m and about ten (10) N-m. More preferably, the motor 10 generates a torque between about two (2) N-m and about five (5) N-m. Most preferably, the motor 10 generates about three (3) N-m torque. However, higher or lower torque motors fall within the scope of some aspects of the present invention.

Preferably, the motor 10 is a single-speed motor that operates between about three thousand (3000) rpm and about nine thousand (9000) rpm. Most preferably, the motor 10 operates at about six thousand (6000) rpm. However, it is within the ambit of the present invention for the motor to have an alternate operational speed. Furthermore, the motor might alternatively be a multi-speed motor or a variable speed motor.

The motor 10 is preferably a high current, low voltage motor. However, other current and voltage configurations are permissible according to some aspects of the present invention.

The motor 10 preferably has a total weight between about three hundred (300) g and about seven hundred (700) g. More preferably, the motor 10 as a whole weighs between about four hundred (400) g and about six hundred (600) g. Most preferably, the motor 10 weighs about four hundred eighty (480) g. However, other motor weights are permissible according to some aspects of the present invention.

As will be discussed in greater detail below, the rotor 12 preferably includes a rotor core 16, a plurality of magnets 18, a shaft assembly (not shown) defining a rotational axis for the rotor 12, and a retention structure 20. As will also be discussed in greater detail below, the stator 14 preferably includes a stator core 22 and a plurality of pre-wound coil assemblies 23 mounted to the core 22. Each coil assembly 23 preferably includes a bobbin 24 and a plurality of coils 26. The coils 26 comprise electrically conductive wiring 27 wound about the respective bobbins 24. The motor 10 further preferably includes a bus bar 28 (illustrated only schematically).

In a preferred embodiment, the stator 14 in a broad sense is generally toroidal in form. The stator core 22 is likewise preferably generally toroidal in form and defines an axis of the stator 14. Preferably, the axis of the stator 14 is coaxial with that of the rotor 12. However, it is permissible according to some aspects of the present invention for the axes to be non-coaxial.

The stator core 22 preferably includes an annular yoke 30 and a plurality of arcuately spaced apart teeth 32 extending at least generally radially from the yoke 30. A plurality of slots 34 are defined between the teeth 32.

Preferably, the teeth 32 extend radially inwardly from the yoke 30 (because of the preferred inner rotor motor design), although it is permissible according to some aspects of the present invention for the teeth to extend generally outwardly or both inwardly and outwardly (e.g., in an outer rotor motor or a dual rotor motor, respectively).

In a preferred embodiment, as illustrated, the yoke 30 extends continuously circumferentially. However, it is permissible according to some aspects of the present invention for the yoke to comprise a plurality of discrete yoke portions, each of which is associated with one or more of the teeth, and which are interconnected by any suitable means (e.g., tongue and groove interconnections, welding, adhesives, friction, and/or circumferential forces).

Each tooth 32 preferably includes a generally radially extending arm 36. Each arm 36 preferably presents a pair of arcuately spaced apart tooth side faces 37, a pair of axially spaced apart tooth top and bottom faces 38, and a radially innermost tooth end face 39 extending between and interconnecting the side faces 37 and the top and bottom faces 38. Each arm 36 is preferably generally rectangularly prismatic in form. That is, the side faces 37 are generally parallel to each other, the top and bottom faces 38 are generally parallel to each other and orthogonal to the side faces 37, and the end faces 39 extend generally orthogonally relative to the side faces 37 and the top and bottom faces 38. However, tapered or otherwise varying arm shapes are permissible according to some aspects of the present invention.

The teeth 32 preferably are devoid of any sort of generally arcuately extending crowns, tips, tabs, or other sorts of projections extending from the arms 36 (e.g., from the side faces 37 and adjacent the end faces 39). That is, each tooth 32 as a whole—not just the arm 36 thereof—preferably presents a generally rectangularly cuboidal profile. Such an omission of crowns, tips, tabs, or projections at least in part enables secure placement of the coil assemblies 23 over the teeth 32. That is, the bobbins 24 preferably each preferably present an inner opening 25 having a width at least substantially equal to a tangential width of the arms 36 and a height at least substantially equal to an axial height of the arms 36. Thus, the bobbins 24 may be slid securely onto respective ones of the arms 36.

It is noted that in an alternate embodiment in which pre-wound coil assemblies are not used, such omission of crowns, tips, tabs, or projections might advantageously facilitate automated needle winding of the teeth.

It is also noted that omission of stator tooth crowns, tips, tabs, or projections is conventionally associated with high slot fill. That is, the greater overall slot space between teeth resulting from such an omission enables the insertion of a higher volume of electrically conductive wire therein (to form larger and/or denser coils). In the present invention, however, the omission is directed solely at enabling the insertion of the pre-wound coil assemblies 23 onto the teeth 32.

Figure 6:
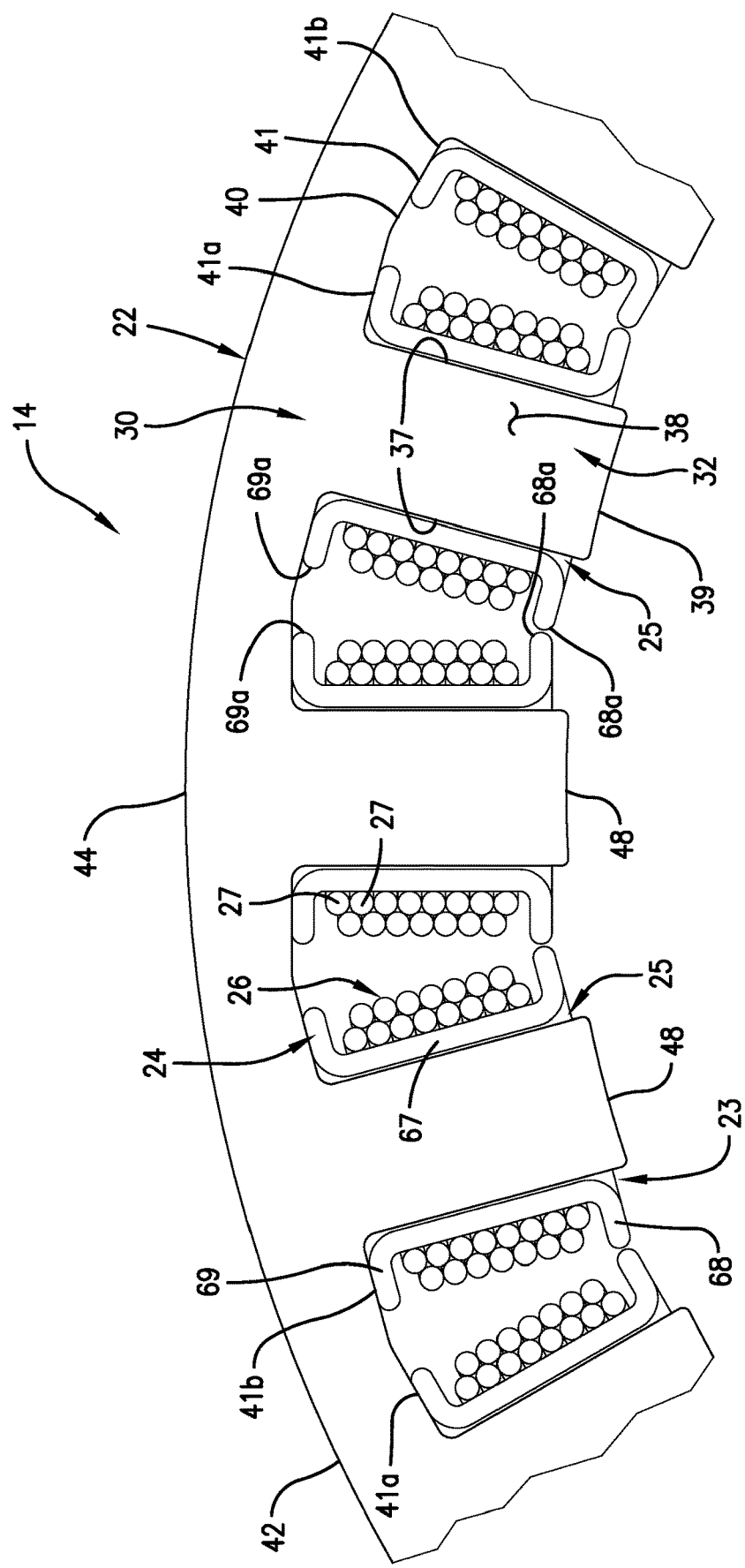
FIG. 6 is an enlarged, fragmentary top view of a portion of the wiring diagram of FIG. 5.
Figure 7:
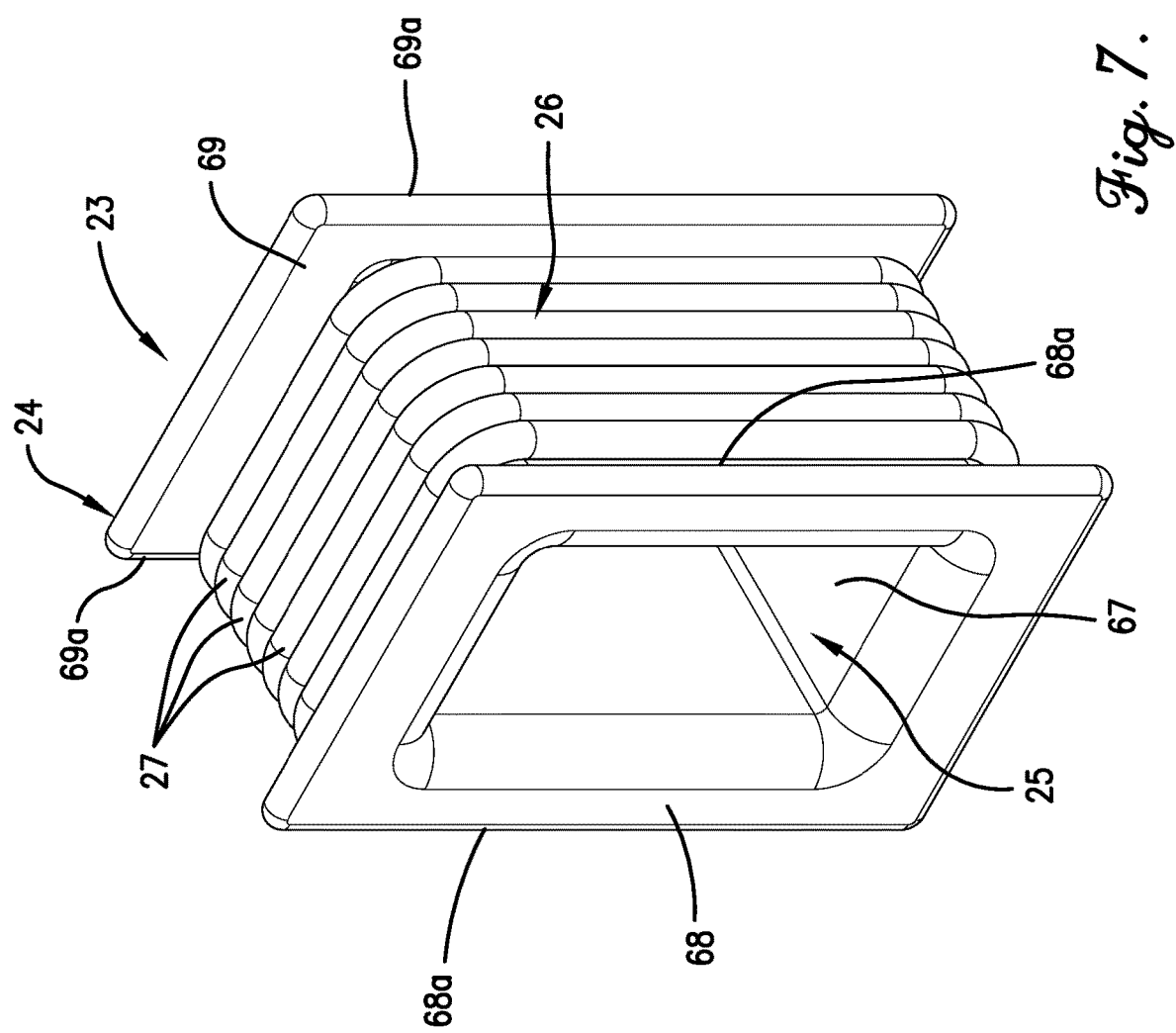
FIG. 7 is a perspective view of a bobbin of the stator of FIGS. 1, 2, 5, and 6.
Figure 8:
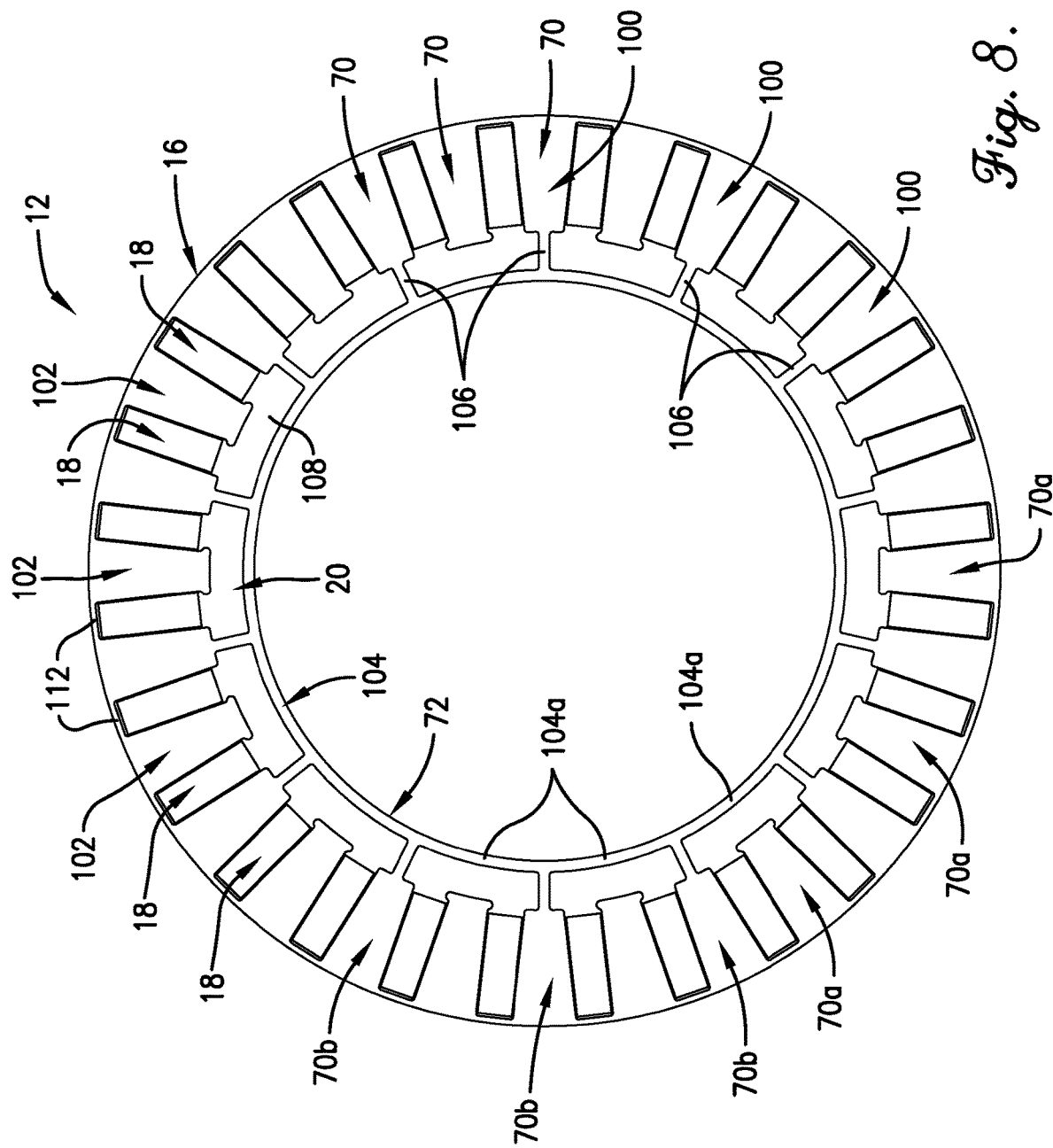
FIG. 8 is a top view of the rotor of the motor of FIGS. 1 and 2.
Figure 9:
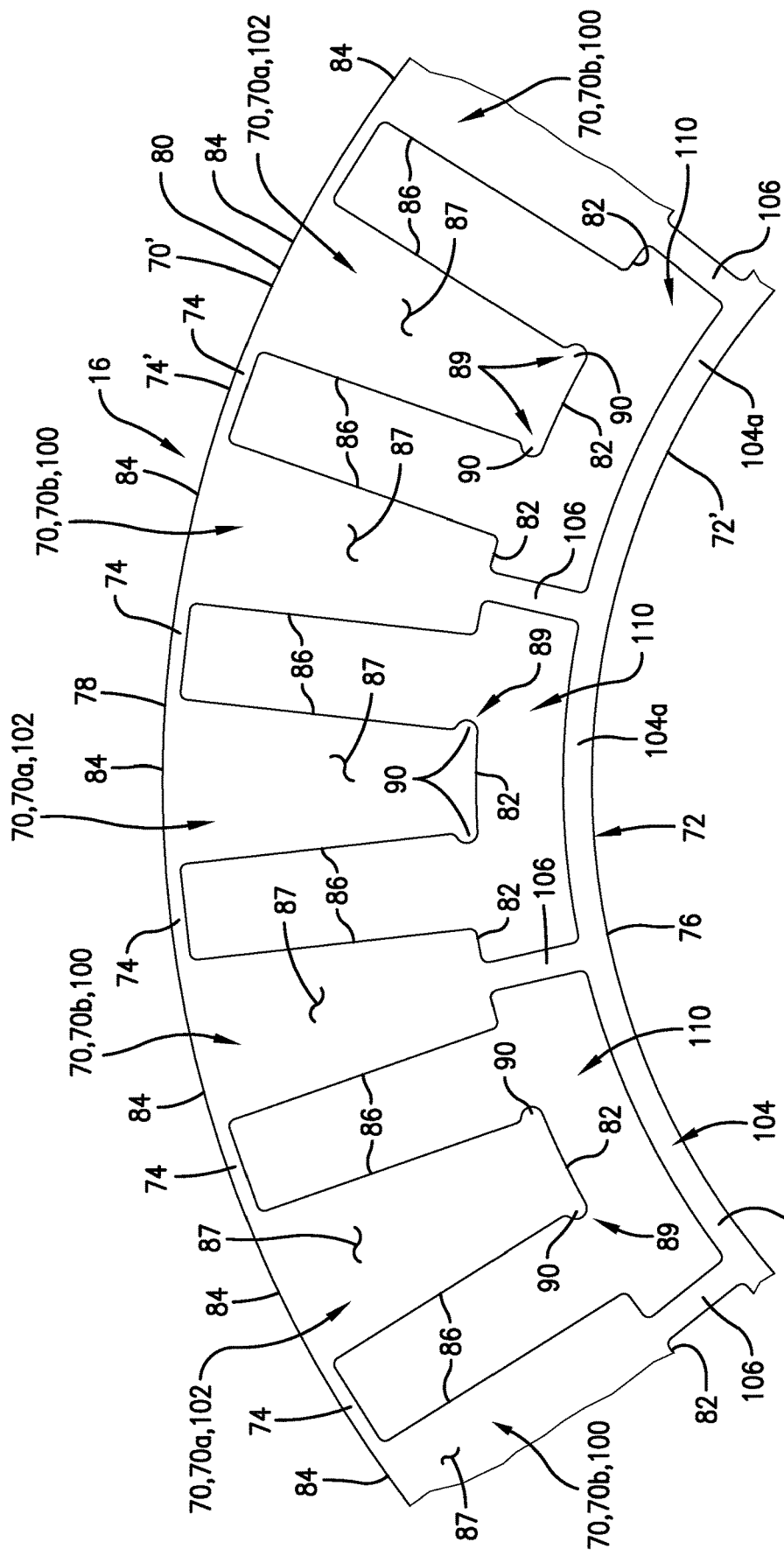
FIG. 9 is an enlarged, fragmentary top view of a portion of the rotor of FIG. 8.

Furthermore, the motor 10 in the preferred, illustrated embodiment does not have an abnormally high slot fill. Rather, it is preferred that the bobbins 24 are pre-wound with the electrically conductive wire 27 to form coils 26 that neither fully nor nearly fully fill the slots 34. For instance, as best shown in FIG. 6, the coils 26 preferably fill less than about fifty (50) percent of each slot 34 (exclusive of the bobbins 24) and most preferably fill less than about thirty-five (35) percent of each slot 34 (again exclusive of the bobbins 24). More particularly, cooling spaces 34a are defined between the coils 26 in order to assist in cooling of the motor 10. A high slot fill is permissible according to some aspects of the present invention, however.

It is further noted that use of teeth 32 that are devoid of crowns, tips, tabs, or projections enables provision of pre-wound coil assemblies 23 on a circumferentially continuous stator core 22. In contrast, a stator having pre-wound coil assemblies conventionally includes a segmented core comprising a plurality of arcuate segments, each including one or more teeth, to facilitate mounting of the assemblies on the core. Use of a continuous core is highly advantageous, however, reducing manufacturing and assembly complexity, as well as eliminating interfaces (e.g., dovetails between adjacent segments) that might adversely affect the motor performance.

Yet further, it is noted that the motor 10 as described herein achieves excellent performance despite the motor 10 not benefitting from the cogging torque reductions that are typically associated with "crowned" teeth.

However, is permissible according to some aspects of the present invention for crowns, tips, tabs, and/or projections to be provided on some or all of the stator teeth.

The yoke 30 preferably presents an inner circumferential yoke face 40 and an outer circumferential yoke face 42. In the preferred inner rotor motor embodiment, the inner circumferential yoke face 40 is preferably discontinuous due to the teeth 32 extending radially inwardly therefrom. More particularly, the yoke face 40 includes a plurality of segments 41. The outer circumferential yoke face 42 is preferably at least substantially continuous and preferably defines an outer radial surface 44 of the stator core 22. However, as noted previously, it is permissible according to some aspects of the present invention for the motor to alternatively be an outer rotor motor or a dual rotor motor. In an alternative outer rotor embodiment, the inner circumferential yoke face might extend continuously to present an inner radial margin of the stator core, while the outer circumferential yoke face might be discontinuous due to the teeth extending radially outwardly therefrom. Appropriate modifications might also be made to facilitate a dual rotor arrangement.

Each inner yoke face segment 41 preferably includes a pair of flat, sloped surfaces 41a, 41b slanting (i.e., angling) radially outwardly toward each other from respective tooth side faces 37. As will be discussed in greater detail below and as best shown in FIG. 6, such a configuration is preferred to enable an optimal fit of the associated bobbins 24 in the slots 34. However, it is permissible according to some aspects of the present invention for alternative segment shapes (e.g., including arcuately extending yoke face segments such that the inner yoke face as a whole is at least substantially cylindrical about the stator axis) to be provided.

The outer circumferential yoke face 42 is preferably at least substantially cylindrical about the stator axis, although one or more flat regions or otherwise alternatively shaped regions might be provided without departing from the spirit of some aspects of the present invention.

As noted previously, each tooth 32 preferably presents an end face 39. The end faces 39 each preferably extend generally arcuately. The end faces 39 most preferably define arcs of circles. The end faces 39 are preferably spaced opposite the yoke 30 to cooperatively define an inner radial surface 48 of the stator core 22, in keeping with the preferred inner rotor motor embodiment. Appropriate modifications associate with an outer rotor or dual rotor motor embodiment may be made according to some aspects of the present invention, however.

It is noted that the circumferentially extending nature of the tooth front faces 39 defines a slight deviation from the preferred otherwise perfectly rectangularly cuboidal form for each tooth 32. It is permissible according to some aspects of the present invention for a flat or otherwise configured front face to be provided on some of all of the stator teeth, however.

The stator core 22 preferably has an outer diameter defined by the outer radial surface 44. The outer diameter of the stator core 22 is preferably between about ninety (90) mm and about one hundred thirty (130) mm. More preferably, the outer diameter of the stator core 22 is between about one hundred (100) mm and about one hundred twenty (120) mm. Most preferably, the outer diameter of the stator core 22 is about one hundred ten (110) mm. It is permissible according to some aspects of the present invention for the outer diameter of the stator core to vary from the preferred dimensions described above, however.

In a preferred embodiment, the outer radial surface 44 of the stator core 22 also defines the outer diameter of the stator 14 as a whole.

The stator core 22 preferably has an inner diameter defined by the inner radial surface 48. The inner diameter of the stator core 22 is preferably between about sixty (60) mm and about one hundred (100) mm. More preferably, the inner diameter of the stator core 22 is between about seventy (70) mm and about ninety (90) mm. Most preferably, the inner diameter of the stator core 22 is about eighty three (83) mm.

It is permissible according to some aspects of the present invention for the inner diameter of the stator core to vary from the preferred dimensions described above. However, in a preferred inner rotor motor 10, as illustrated, such diameter must necessarily be larger than the outer diameter of the rotor 12. More particularly, as will be discussed in greater detail below, the rotor 12 and the stator 14 preferably define a narrow, circumferentially extending gap 50 therebetween.

The gap 50 is preferably less than about two (2) mm in radial thickness and, more preferably, less than about one (1) mm in radial thickness. Most preferably, the gap 50 is about one half (0.5) mm in radial thickness. However, the gap thickness may vary without departing from the scope of the present invention.

In a preferred embodiment, the inner radial surface 48 of the stator core 22 also defines the inner diameter of the stator 14 as a whole.

Preferably, the yoke 30 and the teeth 32 cooperatively present opposite axial stator core end faces 52. (The end faces 52 preferably include the top and bottom faces 38 of the arms 36.) The end faces 52 are preferably at least substantially planar and parallel to each other, although non-parallel and/or non-planar surfaces are permissible according to some aspects of the present invention.

As noted above, each pair of adjacent teeth 32 preferably defines a slot 34 therebetween. Preferably, the stator core 22 includes twenty-four (24) teeth 32, such that twenty-four (24) slots 34 are defined. However, it is permissible according to some aspects of the present invention for the number of teeth and, in turn, the number of slots, to vary.

As briefly described above, the coils 26 preferably comprise electrically conductive wiring 27. More particularly, each coil 26 preferably comprises a plurality of loops of the wiring 27, although it is feasible that a coil might comprise only a single loop of wiring.

As discussed in greater detail below, the wiring 27 is preferably wound about each of the bobbins 24 to form the coils 26, with each of the bobbins 24 and the coils 26 corresponding to one of the teeth 32.

Each coil 26 preferably extends through an adjacent pair of slots 34, although extension through non-adjacent slots is permissible according to some aspects of the present invention. That is, in an alternative embodiment, a single coil might span two (2) or more teeth, rather than simply encircling one (1) tooth as shown. In other words, the wiring might be looped around two (2) or more teeth at a time, rather than being looped around a single tooth. Other winding configurations might also be used without departing from the scope of some aspects of the present invention.

Preferably, the bobbins 24 are wound in pairs to form coil assembly pairs 54, with the twenty-four (24) preferred coil assemblies 23 including twelve (12) pairs 54. A first bobbin 24a in each pair 54 is preferably wound in a counter-clockwise direction, while a second bobbin 24b in each pair 54 is wound in a clockwise direction.

Figure 5:
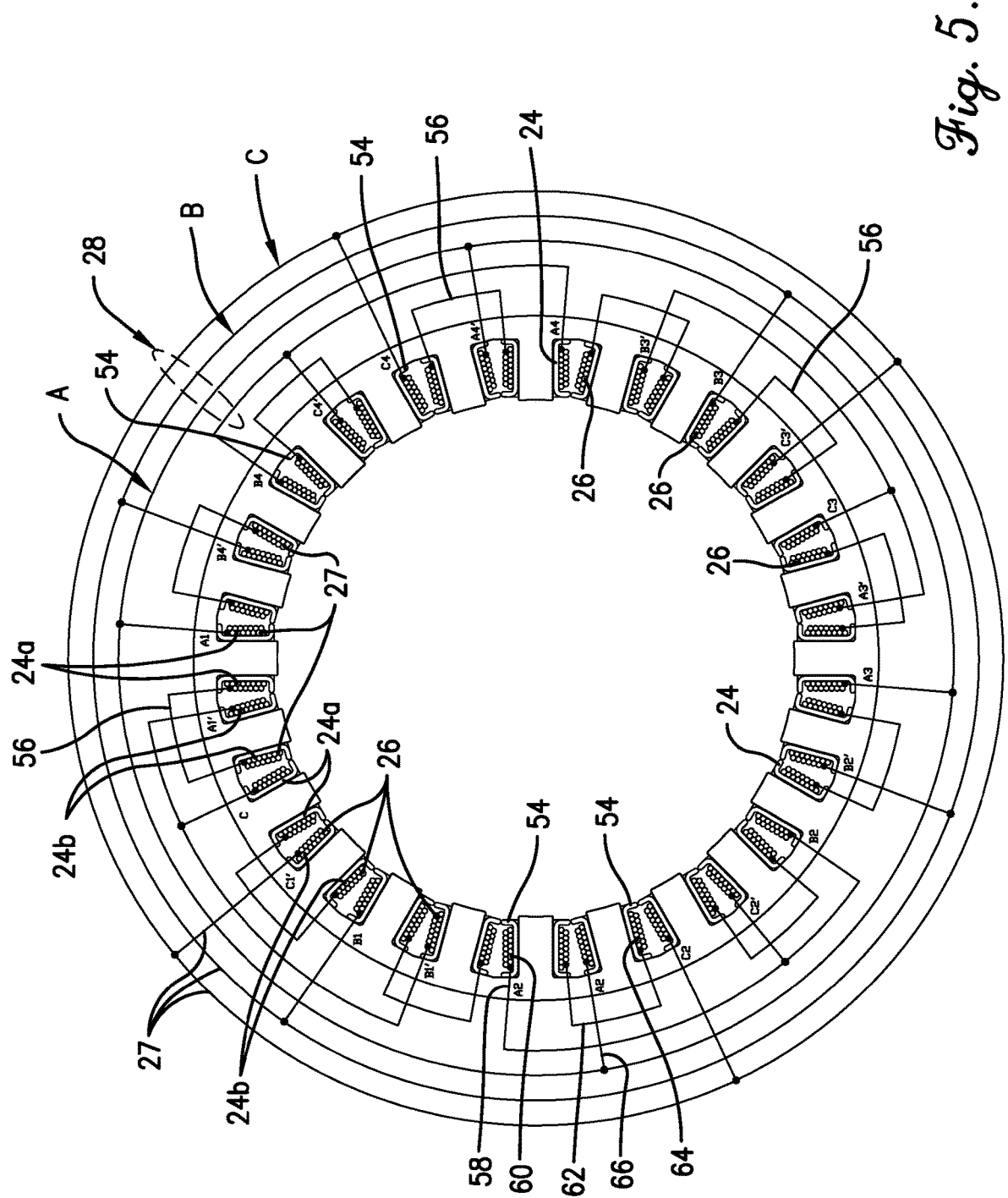
FIG. 5 is a wiring diagram particularly illustrating the electrical wiring configuration of the stator.

The wiring 27 is preferably wound in such a manner that the motor 10 is a three (3) phase motor. Preferably, each coil assembly pair 54 is associated with one of the phases, with the phase-associated coils 26 or, more broadly, coil assemblies 23 (including the bobbins 24 and the coils 26), being arranged in a repeating pattern. As illustrated on FIG. 5, for instance, first and second A-phase coil assemblies denoted A1 and A1', first and second C-phase coil assemblies denoted C1 and C1', and first and second B-phase coil assemblies denoted B1 and B1' are disposed in a counter-clockwise sequence. Second, third, and fourth sequential sets of pairs are likewise disposed in sequence adjacent the first set.

Alternative phasing and/or phasing arrangements/patterns are permissible within the scope of some aspects of the present invention, however.

Preferably, the wiring 27 includes twelve (12) wiring segments 56 each corresponding to one of the coil assembly pairs 54. More particularly, each wiring segment 56 preferably includes a line in or start 58, a first coil portion 60, a connecting portion 62, a second coil portion 64, and a line out or finish 66.

The starts 58 and the finishes 56 are preferably all connected to the bus bar 28.

The wiring 27 is preferably wound about the bobbins 24 such that the wiring 27 is not in direct contact with the stator core 22 itself. Furthermore, the bobbins 24 preferably comprise an at least substantially electrically resistive material such as a synthetic resin. Thus, the bobbins 24 preferably electrically insulate the stator core 22 from the wiring 27 and additionally provide a physical barrier between the stator core 22 and the wiring 27.

The stator core 22 is preferably uncoated. However, it is permissible according to some aspects of the present invention for an electrically insulative covering in the form of endcaps, overmolding, powder-coating, inserts, and/or liners to be provided.

The wiring 27 preferably comprises twenty (20.0) gauge copper, although alternative gauges and/or materials (e.g., aluminum or any one or more of a variety of electrically conductive materials) may be used without departing from the scope of some aspects of the present invention.

Preferably, each coil 26 includes fifteen (15) turns of the wiring 27, although alternate numbers of turns fall within the ambit of some aspects of the present invention. Most preferably, however, as noted above, the turns are such that the coils 26 and bobbins 24 do not achieve a high slot fill, instead allowing cooling channels 34a to remain between the teeth 32.

The stator core 22 is preferably a laminated stator core comprising a plurality of circumferentially continuous (i.e., full round), axially stacked stator laminations 22a. However, it is permissible for the stator core to be a solid stator core and/or constructed of a plurality of arcuate segments without departing from the scope of some aspects the present invention.

Preferably, each stator lamination 22a presents an axial thickness of less than about five tenths (0.5) mm. More preferably, each lamination 22a presents an axial thickness of either about thirty-five hundredths (0.35) mm or about two tenths (0.2) mm.

The stator laminations 22a are preferably formed via punching. However, other formations techniques are permissible.

The stator laminations 22a cooperatively form a stack (i.e., the stator core 22 in a broad sense) having an axial height measured between the core end faces 52. The stack height is preferably between about two (2) mm and about twenty (20) mm. More preferably, the stack height is between about five (5) mm and about fifteen (15) mm. Most preferably, the stator core 22 has an axial height of about ten (10) mm.

The stator core 22 preferably comprises steel. Most preferably, the stator core 22 comprises a high grade steel to reduce core losses. For instance, stator laminations 22a having a thickness of about thirty-five hundredths (0.35) mm preferably comprise M19/Ga29 steel. Such a grade might also be used for the two tenths (0.2) mm stator laminations 22a. An alternative high-grade steel (e.g., certain chromium-vanadium steels or one of a variety of high silicon steels) might also be used. However, it is permissible without departing from the scope of some aspects of the present invention for any one or more of a variety of suitable materials to be used for the stator core.

The stator core 22 and the coil assemblies 23 are collectively designed to optimally balance stator performance, cost, ease of assembly, thermal characteristics, etc. As noted previously, for instance, omission of crowns, tips, tabs, or projections enables use of pre-wound coil assemblies 23, which reduces manufacturing complexity and assembly time, as well as costs. Moderation in slot fill enables the presence of cooling channels 34a, aiding in maintenance of acceptable thermal conditions of the motor 10. Provision of rectangularly cuboidal arms 36 enables a secure fit of the bobbins 24 thereon.

Furthermore, beyond the aforementioned central opening 25 complementing the arms 36, each bobbin 24 is designed to broadly complement the design of the stator core 22 as a whole. For instance, each bobbin 24 preferably includes a sleeve 67 and radially inner and outer annular flanges 68 and 69 extending from the sleeve. The inner flange 68 is preferably disposed adjacent the corresponding tooth end face 39. The outer flange 69 preferably overlies corresponding sloped surfaces 41a of the corresponding inner yoke face segments 41.

Preferably, the inner and outer flanges 68 and 69 are identical or at least substantially identical to one another. That is, the bobbins 24 are at least substantially symmetrical across both a transverse plane and a radial plane.

Each outer flange 69 preferably presents arcuately spaced apart margins 69a that are spaced from the margins 69a of adjacent outer flanges 69.

Figure 2:
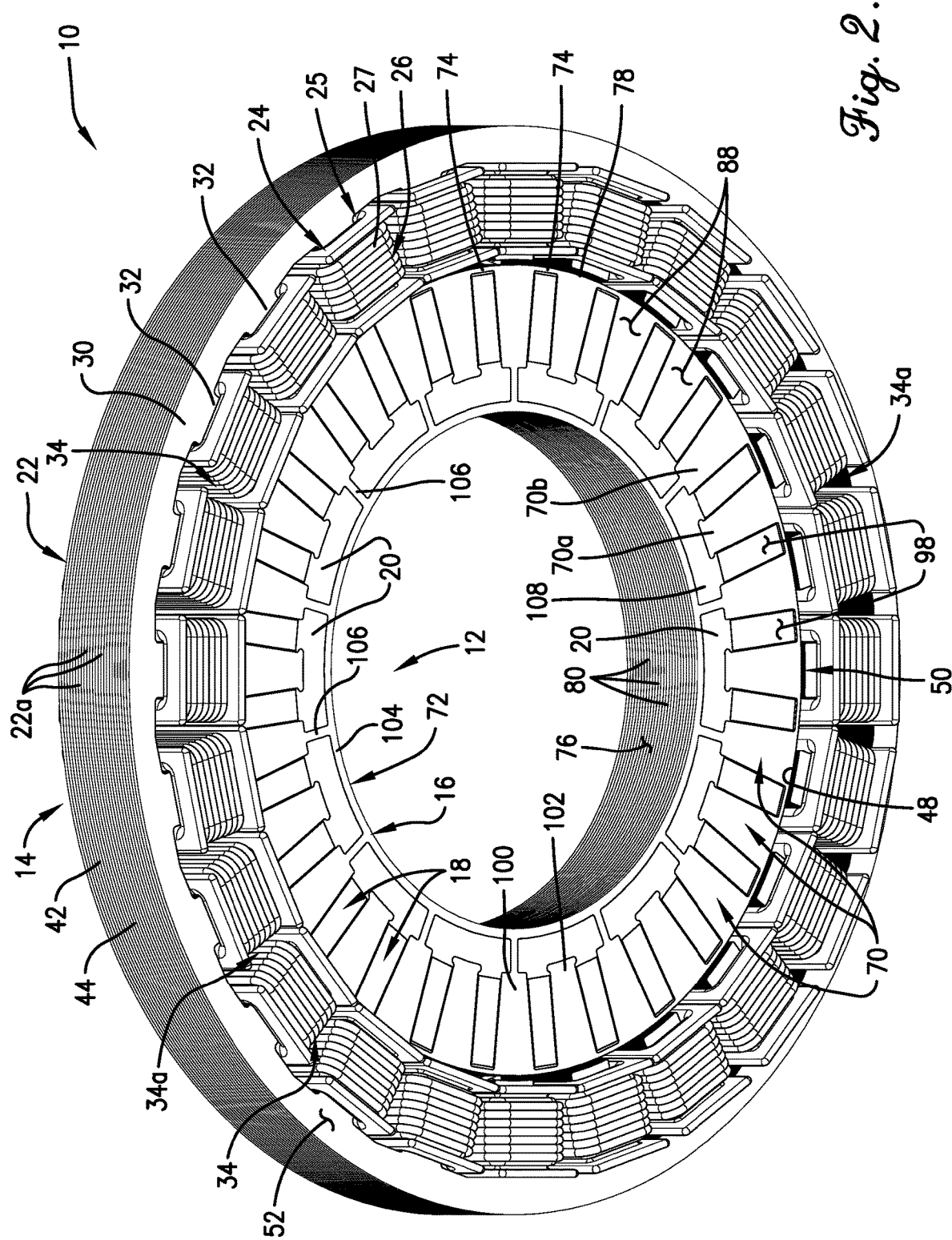
FIG. 2 is a bottom perspective view of the motor of FIG. 1.
Figure 3:
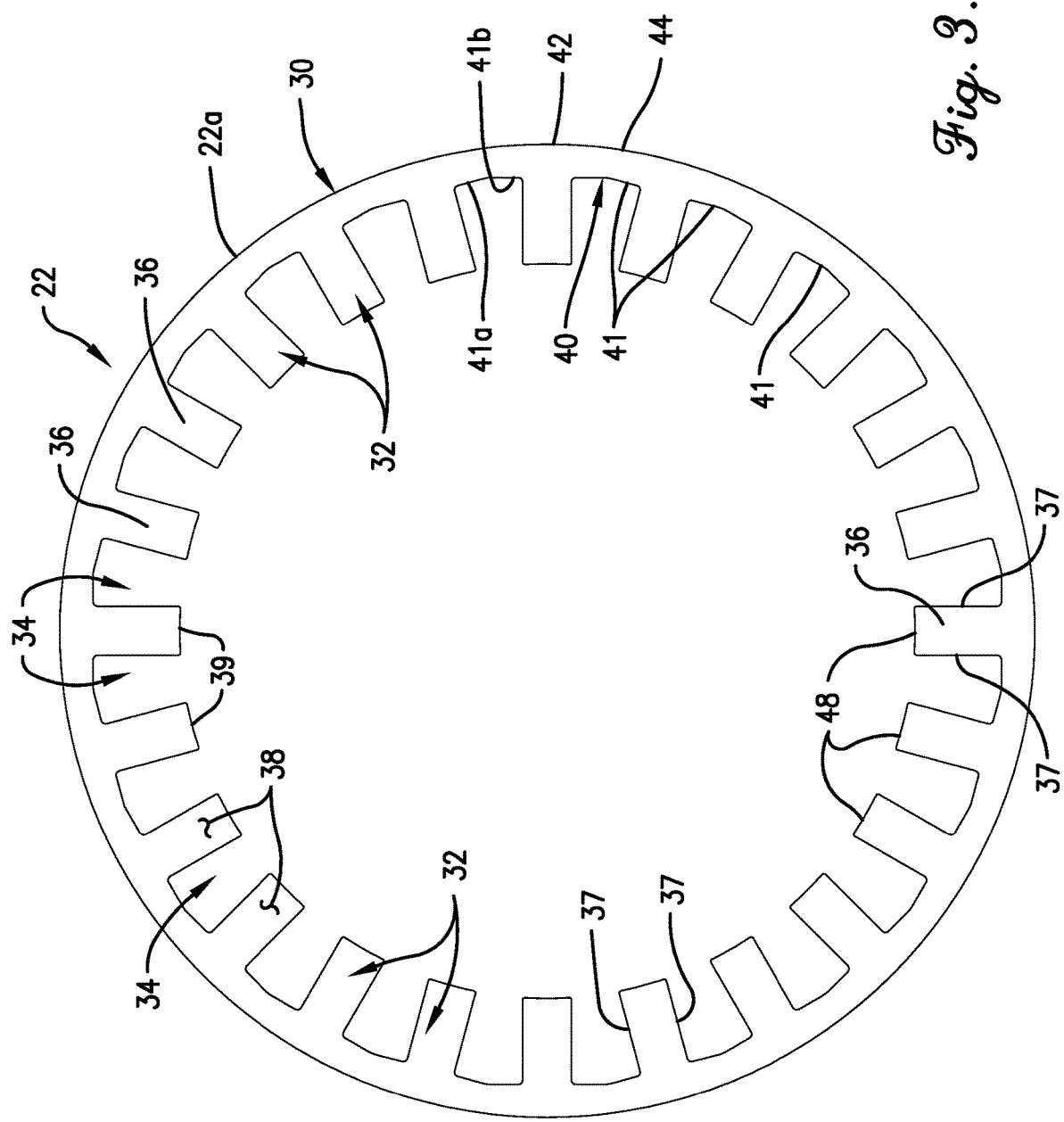
FIG. 3 is a top view the stator core of the motor of FIGS. 1 and 2.
Figure 4:
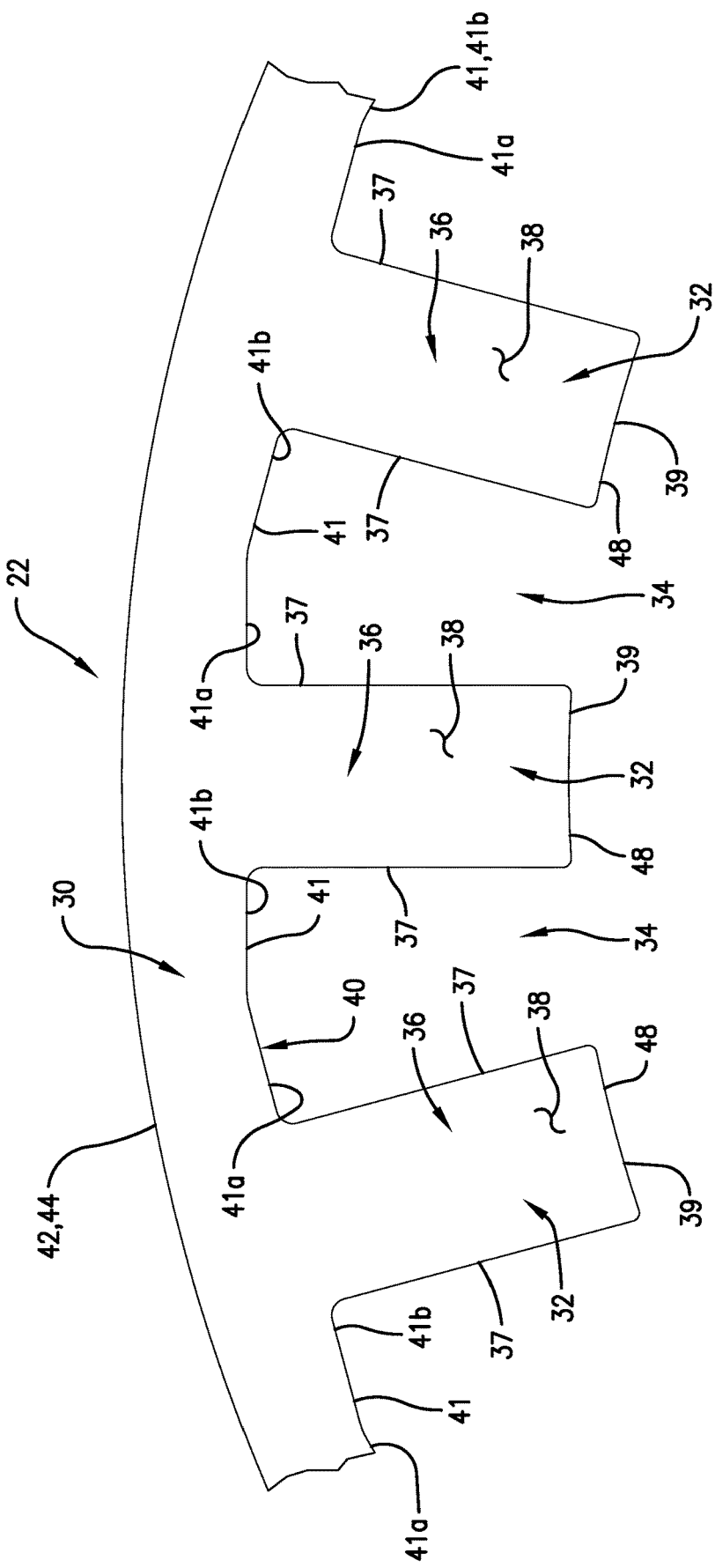
FIG. 4 is an enlarged, fragmentary top view of a portion of the stator core of FIG. 3.

In contrast, as best shown in FIG. 2a, each inner flange 68 preferably presents arcuately spaced apart margins 68a that very nearly engage (or perhaps even contact) the margins 68a of adjacent inner flanges 68. That is, each margin 68a is preferably immediately adjacent a margin 68a of an adjacent inner flange 68, where "immediately adjacent" as used herein with reference to the margins 68a may be understood to mean in direct contact with or spaced less than about one (1) degree therefrom. In the illustrated embodiment, for instance, a gap 68' between adjacent margins 68a is less than one (1) degree or, alternatively stated, is about four thousandths (0.004) inches. Still further alternatively stated, the margins 68a of a single inner flange 68 are preferably spaced apart by between about fourteen (14) degrees and about fifteen (15) degrees, in keeping with the preferred twenty-eight (28) tooth configuration of the stator 12. Thus, each gap 68' has an arcuate dimension that is less than about one-fourteenth (1/14) and more preferably approaching about one-fifteenth (1/15) the arcuate extent of the adjacent flanges 68.

In such a manner, space within the stator core 22 is maximized, and the inner flanges additionally serve as wire management structure for preventing shifting of wiring 27 radially inwardly, potentially into interference with the rotor 12.

As noted previously, the rotor 12 preferably includes the rotor core 16, the magnets 18, the shaft assembly (not shown), and the retention structure 20.

The rotor core 16 preferably comprises a plurality of pole segments 70, a connecting element 72, and a plurality of links 74. In a preferred embodiment, as illustrated, the pole segments 70 are arranged arcuately about the axis and alternate arcuately with the magnets 18, such that each of the magnets 18 is at least in part interposed between adjacent pole segments 70. The connecting element 72 and the links 74 interconnect at least some of the pole segments 70, as will be discussed in greater detail below.

In a preferred embodiment, the connecting element 72 and the links 74 at least in part present inner and outer radial surfaces 76 and 78, respectively, of the rotor core 16. More particularly, the connecting element 72 preferably presents the inner radial surface 76 of the rotor core 16. The links 74 and the pole segments 70 preferably cooperatively present the outer radial surface 78 of the rotor core 16. Thus, the connecting element 72 defines an inner diameter of the rotor core 16. The links 74 and the pole segments 70 cooperatively define an outer diameter of the rotor core 16 and, more broadly, the rotor 12 as a whole.

The inner diameter of the rotor core 16 is preferably between about thirty (30) mm and about seventy (70) mm. More preferably, the inner diameter of the rotor core 16 is between about forty (40) mm and about sixty (60) mm. Most preferably, the inner diameter of the rotor core 16 is about fifty-two (52) mm.

The outer diameter of the rotor core 16 is preferably between about sixty (60) mm and about one hundred (100) mm. More preferably, the outer diameter of the rotor core 16 is between about seventy (70) mm and about ninety (90) mm. Most preferably, the outer diameter of the rotor core 16 is about eighty-two (82) mm.

Thus, as noted previously, it is most preferred that the gap 50 have a radial dimension of about five tenths (0.5) mm.

It is permissible according to some aspects of the present invention for the inner and/or outer diameter of the rotor core to vary from the preferred dimensions described above. However, in a preferred inner rotor motor 10, as illustrated, the outer diameter of the rotor 12 must necessarily be smaller than the inner diameter of the stator 14.

The rotor core 16 is preferably a laminated rotor core comprising a plurality of axially stacked rotor laminations 80. However, it is permissible for the rotor core to be a solid (i.e., non-laminated) rotor core without departing from the scope of some aspects the present invention. The laminations 80 preferably cooperatively define the pole segments 70, the connecting element 72, and the links 74, with each lamination 80 comprising a plurality of pole segment layers 70', a connecting element layer 72', and a plurality of link layers 74'. However, as will be discussed in greater detail below, it is permissible according to some aspects of the present invention for part or the entirety of the connecting element to be formed separately from the pole segments (or layers thereof).

Preferably, each rotor lamination 80 presents an axial thickness less than about five tenths (0.5) mm. More preferably, as discussed below, each rotor lamination 80 presents an axial thickness of either about thirty-five hundredths (0.35) mm or about two tenths (0.2) mm, most preferably in correspondence with the stator lamination thicknesses.

The rotor laminations 80 are preferably formed via punching. However, other formations techniques are permissible.

The rotor laminations 80 cooperatively preferably form a stack (i.e., the rotor core 16) having an axial height of between about two (2) mm and about twenty (20) mm. More preferably, the stack height is between about five (5) mm and about fifteen (15) mm. Most preferably, the rotor core 16 has an axial height of about ten (10) mm.

The rotor core 16 preferably comprises steel. Most preferably, the rotor core 16 comprises a high grade steel to minimize core losses. For instance, rotor laminations 80 having a thickness of about thirty-five hundredths (0.35) mm preferably comprise M19/Ga29 steel. Such a grade might also be used for the two tenths (0.2) mm rotor laminations 80. An alternative high-grade steel (e.g., certain chromium-vanadium steels or one of a variety of high silicon steels) might also be used. However, it is permissible without departing from the scope of some aspects of the present invention for any one or more of a variety of suitable magnetically conductive materials to be used for the rotor core.

Preferably, the pole segments 70 are evenly arcuately arranged about the rotor axis of rotation. Similarly, the magnets 18 are preferably evenly arcuately arranged. Yet further, each magnet 18 is preferably centrally positioned between adjacent pole segments 70. Each magnet 18 is also preferably in direct contact with adjacent ones of the pole segments 70 or very nearly so, with any gaps provided solely for ease of insertion during assembly. It is permissible according to some aspects of the present invention, however, for uneven arrangements or variably spaced arrangements to be used. A material (such as synthetic resin overmolding) or an air gap might also be disposed between the magnets and the pole segments to intentionally or perhaps only inadvertently (e.g., in the case of overmolding leakage into a portion of a gap) prevent direct contact therebetween.

In a preferred embodiment, twenty-eight (28) pole segments and twenty-eight (28) magnets 18 are provided, such that the motor 10 is a twenty-four (24) slot, twenty-eight (28) pole motor. However, it is permissible according to some aspects of the present invention for certain other numbers of slots and poles achieving a preferred six (6) slot:seven (7) pole ratio to be present. Yet further, the motor may instead have an entirely different slot:pole ratio without departing from some aspects of the present invention.

It is noted that a high pole count (associated with a large number of pole segments 70) enables a relatively lower motor weight. Among other things, for instance, a high pole count enables use of a thinner stator yoke; decreased end turn volume and overall coil size (which results in decreased overall wire usage, decreased wire weight, decreased wire losses, and increased air flow through the stator slots); and greater flux. Preferably, any performance losses that may be associated with some of the above changes are at least in part offset by the use of high quality magnets and steel.

It is also noted that steel losses become predominant at high speeds. Use of high-grade steel for both the stator core 22 and the rotor core 16, as described above, is thus particularly advantageous in the preferred embodiment described herein.

In a preferred embodiment, the pole segments 70 are spaced apart such that adjacent pole segments 70 do not contact each other except by means of the connecting element 72 and the links 74, as will be discussed in greater detail below.

It is permissible according to some aspects of the present invention, however, for contact between pole segments to occur beyond that which will be discussed below in association with the connecting element 72 and the links 74. For instance, one or more additional bridges or other connecting elements might be provided between certain of the pole segments, or at least some of the pole segments might directly abut each other. In such alternative embodiments, contact or connections between pole segments may allow for negligible transfer of magnetic flux (e.g., a small amount of flux transferred via a strategically positioned, very thin additional bridge) or significant flux transfer (e.g., a larger amount of flux that is transferred via a thick interconnecting beam). However, such permissible alternative embodiments must meet certain requirements elucidated in greater detail below. That is, certain interconnecting structures and/or forms of contact between certain of the pole segments fall outside the scope of the present invention.

In a preferred embodiment, each pole segment 70 preferably includes a radially innermost face 82, a radially outermost face 84, and a pair of side walls 86. Each pole segment 70 further preferably presents axially spaced apart top and bottom faces 87 and 88.

The pole segments 70 are preferably generally trapezoidally cuboidal in form, with the side walls 86 tapering radially inwardly toward each other. Preferably, such shaping facilitates good contact or abutment with adjacent ones of the magnets 18 (which, as discussed in detail below, are preferably rectangularly cuboidal in form). Alternative geometries may fall within the scope of some aspects of the present invention, however.

The pole segments 70 preferably include positioning pole segments 70a alternately arcuately arranged with non-positioning pole segments 70b. The positioning pole segments 70a each preferably include magnet-positioning structure 89. The magnet-positioning structure 89 preferably includes a pair tabs or ears 90. The tabs 90 of each pair are preferably arcuately spaced apart, oppositely circumferentially outwardly projecting, and disposed at radially innermost portion of the corresponding positioning pole segment 70 to in part define the corresponding radially innermost face 82. The tabs 90 of a single positioning pole segment 70a thereby at least in part restrict radial displacement (more particularly, radially inward displacement) of the two (2) adjacent ones of the magnets 18.

Although it is permissible according to some aspects of the present invention for all of the pole segments 70 to include magnet-positioning structure, the omission of such structure on alternating ones of the pole segments 70 in the preferred embodiment decreases the flux that might otherwise flow between adjacent radially innermost faces 82. That is, detrimental flux flow might occur between adjacent tabs (i.e., ears pointing circumferentially toward one another from adjacent pole segments), should such an alternative embodiment be provided.

It is also permissible according to some aspects of the present invention for magnet-positioning structure as described herein to be omitted entirely.

In a preferred embodiment, the magnets 18 are permanent magnets. Furthermore, the magnets 18 preferably comprise neodymium. Most preferably, the magnets 18 are 45 SH grade. However, other magnet materials (e.g., ferrite) and/or grades may be used without departing from the scope of some aspects the present invention.

Each magnet 18 is preferably generally cuboidal in form. More particularly, each magnet 18 preferably presents a radially innermost face 92, a radially outermost face 94, a pair of circumferentially spaced apart side faces 96, and axially spaced apart top and bottom faces 97 and 98. The faces 92, 94, 96, 97, and 98 are preferably at least substantially flat and arranged in a rectangularly cuboidal manner. It is permissible according to some aspects of the present invention, however, for the magnet shapes to vary (e.g., via the provision of one or more curved faces and/or non-orthogonal interfaces between the faces). However, it is preferred that the pole segments and magnets be shaped in complementary manners.

The radially innermost face 92 of each magnet 18 preferably abuts one of the tabs 90 of the adjacent positioning pole segment 70a. Furthermore, each of the side faces 96 preferably directly abuts a corresponding one of the pole segment side walls 86. Thus, circumferential and radial shifting of each magnet 18 is at least substantially restricted by the adjacent pole segments 70.

In a preferred embodiment, each magnet 18 is preferably oriented such that its polarity is oriented generally tangentially. Furthermore, the directions of polarity of the magnets 18 are preferably alternated. More particularly, the north pole of a first one of the magnets 18a preferably faces the north pole of a second, arcuately adjacent one of the magnets 18b. Likewise, the south pole of the first one of the magnets 18a preferably faces the south pole of a third, arcuately adjacent one of the magnets 18c, and so on. That is, each pole segment 70 preferably abuts only like poles of the adjacent magnets 18, with the pole segments 70 therefore alternating in polarity. That is, each pole segment 70 "inherits" the polarity of the immediately adjoining portion of the adjacent magnets 18, with the magnets 18 arranged such that the portions adjoining a given pole segment 70 have like polarities. Thus, the pole segments 70 preferably include a plurality of first-polarity pole segments 100 and a plurality of second-polarity pole segments 102, wherein the polarities of the two subsets 100 and 102 are opposite (i.e., north and south, respectively, or vice versa).

As will be apparent to one of ordinary skill in the art, such a preferred arrangement results in the pole segments 70 presenting alternating polarities from one pole segment 70 to the arcuately adjacent pole segment 70 (i.e., from first-polarity pole segment 100 to second-polarity pole segment 102). That is, each north-polarity pole segment 70 will be flanked arcuately by a pair of south-polarity pole segments 70, and vice versa. Alternatively stated, the first-polarity pole segments 100 preferably alternate arcuately with the second-polarity pole segments 102, such that each of the first-polarity pole segments 100 is at least in part disposed between a pair of adjacent second-polarity pole segments 102.

It is permissible according some aspects of the present invention for alternatively oriented and/or arranged magnets to be provided. However, as will be discussed in greater detail below, such permissible alternative embodiments must meet certain requirements in order to fall within the scope of the present invention. In greater detail, certain magnet arrangements and orientations and, in turn, certain pole structure polarities, fall outside the scope of the present invention when associated with certain interconnecting structures and/or other forms of contact between pole segments.

It is also permissible according to some aspects of the present invention for alternative internal pole segment polarity patterns to be present. That is, although it is most preferred for each pole segment 70 to be fully polarized to either a north polarity or a south polarity, split polarization might be permissible when accompanied by a suitably configured connecting element, etc., as described below.

Preferably, the connecting element 72 connects at least some of the first-polarity pole segments 100 to each other. Most preferably, the connecting element 72 connects all of the first-polarity pole segments 100 to one another.

More particularly, in a preferred embodiment, the connecting element 72 includes a continuously annular and, most preferably, circularly annular nexus 104 and a plurality of bridges 106. Each bridge 106 preferably extends between and interconnects a corresponding one of the first-polarity pole segments 100 to the nexus 104. Thus, each first-polarity pole segment 100 is capable of being in magnetic communication with the nexus 104 and, in turn, others of the first-polarity pole segments 100. That is, the bridges 106 and the nexus 104 most preferably link each of the first-polarity pole segments 100 to the others, with each bridge 106 and associated portion of the nexus 104 spanning two (2) of the magnets 18. Fourteen (14) bridges 106 are thus most preferably provided, in keeping with the preferred twenty-eight (28) pole rotor configuration.

Most preferably, the bridges 106 each extend radially (or at least generally radially) from the corresponding first-polarity pole segment 100 to the nexus 104.

Most preferably, the nexus 104 is centered about the rotor axis, although non-centered positioning falls within the scope of some aspects of the present invention. Furthermore, the nexus 104 preferably defines a central opening 105. (That is, the nexus is preferably ring-like rather than disk- or plate-like.) A variety of other nexus shapes, including disk-like or plate-like forms, fall within the ambit of the present invention, however.

Alternative bridge orientations and arrangements are permissible according to some aspects of the present invention. For instance, rather than a single bridge extending from each of the first-polarity pole segments to the nexus, each first-polarity pole segment might be associated with a sub-bridge of sorts that, along with other sub-bridges, converges or connects to a larger bridge extending to the nexus. In another alternatives, subsets of the bridges might all converge at respective junction points distributed around the nexus, in contrast to the preferred even spacing.

In yet further alternatives, the nexus might be omitted entirely. For instance, the bridges might overlap one another in some manner (e.g., a grid), simply directly link two (2) or more adjacent or non-adjacent ones of the first-polarity pole segments, etc.

Although many potential arrangements fall within the scope of the present invention, however, it is essential that the connecting element 72 not connect first-polarity pole segments 100 to second-polarity pole segments 102. Such a connection would result in detrimental flux losses.

More particularly, in a broad sense, at least substantial magnetic isolation of rotor pole segments provides numerous advantages. Among other things, for instance, at least substantial magnetic isolation of rotor pole segments results in concentration of the magnetic flux and reduced flux leakage, which in turn results in higher power density. However, conventional methods of achieving such isolation (e.g., provision of entirely discrete and non-interconnected pole segments that must be placed in position prior to overmolding or other fixation/positioning techniques during assembly) require complex manufacturing processes and/or tedious assembly. In the present invention, the connecting element 72 interconnects only pole segments 70 having like polarity (e.g., only north polarized pole segments or only south-polarized pole segments). Flux can travel between such pole segments without losses occurring. Thus, manufacturing is simplified, assembly is streamlined, and performance is maintained relative to conventional spoked rotors.

However, should bridges be provided that interconnect pole segments of opposite polarities, flux leakage would occur, leading to degraded motor performance. Thus, according to the present invention, the connecting element 72 does not connect any of said second-polarity pole segments 102 to any of said first-polarity pole segments 100.

As will be apparent to one of ordinary skill in the art, it is possible to vary the span of each pair of bridges 106 and a portion 104a of the nexus 104 extending between said bridges 106 while maintaining the flux retention advantages described above. For instance, in a rotor configured to present pole segments of arcuately alternating polarity, each bridge pair and associated nexus portion might span any even number of magnets by interconnecting every second (as shown), fourth, sixth, eighth, etc. pole segment. Preferably, however, the spans are such that the connecting element 72 retains symmetry about the rotor axis (e.g., interconnecting every second, fourth, or fourteenth pole segment). Thus, flux flow through only like-polarity segments is maintained, along with general rotor balance. Of course, should the pole segments be arranged in some other manner such that polarities are not arcuately alternating, appropriate spans might vary from those described above. In such a case, it should simply be understood that it is necessary that only like-polarity segments are connected to one another.

One of ordinary skill in the art will recognize that greater spans are associated with less material usage and associated cost, but also with less structural rigidity. Smaller spans, conversely, require more material and thus are more expensive, but provide greater structural rigidity.

In a preferred embodiment, as illustrated, only one connecting element 72 is provided. However, it is permissible according to some aspects of the present invention for a second connecting element that is magnetically isolated (or at substantially magnetically isolated) relative to the first connecting element to be provided. Such second element could conceivably connect some or all of the second-polarity pole segments to one another (while not connecting the second-polarity pole segments to the first-polarity pole segments).

In yet another alternative, one or more additional connecting elements associated with the first-polarity pole segments might be provided.

Furthermore, although it is preferred that the laminations 80 of the rotor core 16 integrally define the pole segments 70, the connecting element 72, and the links 74, it is permissible according to some aspects of the present invention for the connecting element 72 to be discretely formed and connected to the first-polarity pole segments 100 via mechanical and/or other connection types. For instance, complementary dovetail components might be provided to fix the first-polarity pole segments 100 to the connecting element 72.

It is noted that, in the preferred illustrated embodiment, the first-polarity pole segments 100 are shaped differently than the second-polarity pole segments 102. More particularly, the aforementioned positioning pole segments 70*a*, which include the magnet-positioning structure 89, are the second-polarity pole segments 102. The non-positioning pole segments 70*b* are the first-polarity pole segments 100. It is permissible according to some aspects of the present invention for such association to be reversed. However, such a reversal is not desirable due to the preferred provision of space between the bridges 106 and the magnet-positioning structures 89 to avoid unnecessary losses via flux flow therebetween.

Preferably, the pole segments 70 collectively are arranged and distributed symmetrically about the axis. The connecting element 72 is also preferably rotationally symmetrical. Still further, the rotor core 16 and, more broadly, the rotor 12 are preferably rotationally symmetrical or at least substantially so.

As noted previously, in a preferred embodiment, the connecting element 72 presents an inner radial surface 76 of the rotor core 16. Thus, as will be apparent to those of ordinary skill in the art, the connecting element 72 is preferably disposed radially inwardly of the pole segments 70. Alternatively stated, the radially innermost faces 82 of the pole segments 70 preferably cooperatively present a radially inner margin 82*a*. The outermost faces 84 preferably present a radially outer margin 84*a*. The connecting element 72 is disposed adjacent the inner margin 82*a*. In greater detail still, each bridge 106 preferably extends radially inwardly from a corresponding one of the faces 82.

However, it is permissible according to some aspects of the present invention for the connecting element to be alternatively positioned relative to the pole segments. In an outer rotor motor, for instance, the connecting element might be disposed radially outside the pole segments. More particularly, the connecting element might be disposed adjacent the outer margin and with bridges extending from the outermost faces. Correspondingly adjusted dual rotor arrangements are contemplated, as well.

In a preferred embodiment, each lamination 80 is identical to the other laminations 80. Thus, the connecting element 72 is axially continuous. However, axial discontinuities fall within the scope of some aspects of the present invention.

In a preferred embodiment, each of the first-polarity pole segments 100 presents a minimum generally arcuate (i.e., tangential) first-polarity pole segment width. In the illustrated embodiment, for instance, such width is along the radially innermost face 82. Each bridge 106 preferably presents a maximum generally arcuate (i.e., tangential) bridge width. The bridge width is preferably between about fifteen (15) percent and about fifty (50) percent of the first-polarity pole segment width. More preferably, the bridge width is between about thirty (30) percent and about thirty-five (35) percent of the first-polarity pole segment width. However, alternative relative widths fall within the scope of some aspects of the present invention.

Preferably, the nexus 104 presents a generally radial thickness that is at least substantially equal to the bridge width. However, disparate thicknesses are permissible according to some aspects of the present invention.

As noted previously, the rotor core 16 also includes a plurality of links 74. Each link 74 preferably extends between and interconnects adjacent ones of the pole segments 70. More particularly, each link 74 preferably extends between and interconnects a first-polarity pole segment 100 and a second-polarity pole segment 102. The links 74 preferably provide additional structural rigidity to the rotor core 16.

In a preferred embodiment, the links 74 extend generally arcuately or tangentially such that a generally circumferential path is formed about a radial margin of the core. Most preferably, the links 74 extend circumferentially about the outer radial surface 78 of the rotor core. More particularly, each link 74 preferably extends between the opposing side faces 96 of a pair of adjacent pole segments 70, adjacent the outer faces 94 thereof.

Alternatively stated, the links 74 are preferably disposed adjacent the radially outer margin 84*a*. Thus, the links 74 are preferably spaced from the connecting element 72 and, more specifically, disposed adjacent an opposite one of the inner and outer margins 82*a* and 82*b*.

Although the above-described disposition is most preferred, it is permissible according to some aspects of the present invention for the links 74 to be alternatively placed. For instance, in an outer rotor motor, the links might be disposed at a radially innermost margin, with the connecting element being shifted to a radially outer position. In another alternative, the links might be spaced from the margins.

Preferably, a link 74 connects each pair of adjacent pole segments 70. However, it is permissible according to some aspects of the present invention for the links to interconnect only some of the pole segments or be omitted entirely.

Each link 74 preferably extends adjacent the radially outermost face 94 of a corresponding one of the magnets 18 to at least substantially restrict radially outward shifting of the corresponding magnet 18.

Each link 74 preferably presents a relatively small radial thickness to mitigate flux flow therethrough. For instance, in a preferred embodiment, each link 74 has a radial thickness that is less than the width of the bridges 106 and the nexus 104. More preferably, the link thicknesses are between about twenty-five (25) percent and about seventy-five (75) percent of the nexus width and bridge width. Most preferably, the links 74 have a thickness of about fifty (50) percent that of the nexus 104 and the bridge 106.

It is noted that although flux losses may occur through the links 74, structural rigidity and associated advantages (e.g., easier assembly, etc. as discussed above) are provided by said links 74.

As noted previously, at least substantial magnetic isolation of rotor pole segments provides numerous advantages. However, such advantages are conventionally associated with disadvantageous increases in manufacturing and assembly complexity and, in turn, costs. In the present invention, the links 74 allow small losses but greatly simplify rotor assembly while providing some degree of rigidity. The connecting element 72 allows significant flux flow but only via like-polarity pole segments 100, such that no losses are incurred yet rotor rigidity and ease of assembly are greatly increased. That is, the connecting element 72 facilitates structural support of the pole segments without flux leakage.

The rotor 12 preferably includes a retention structure 20. The retention structure 20 preferably additionally secures the pole segments 70 relative to each other and the magnets 18 relative to each other. That is, the retention structure 20 aids the connecting element 72 and the links 74 in spatially fixing the pole segments 70. In a broad sense, the retention structure 20 also substantially increases the rigidity of the rotor core 16. Furthermore, the retention structure 20 preferably aids in securing the pole segments 70 and the magnets 18 to each other.

In a preferred embodiment, the retention structure 20 is formed of a magnetically insulative material, such that no magnetic flux or only negligible magnetic flux (e.g., the flux corresponding to a flux density of fifteen (15) mT or less) flows therethrough. More particularly, the retention structure 20 preferably supports and positions the pole segments 70 and the magnets 18 in such a manner as to magnetically isolate the pole segments 70 with the exception of the previously described negligible flux flow occurring through the links 74 and substantive flux flow occurring only between the first-polarity pole segments 100. That is, the inherent spacing of the pole segments 70 in combination with the magnetically insulative composition of the retention structure 20 is such that flow of magnetic flux between the pole segments 70, except via the connecting element 72 and the links 74, is largely avoided.

Furthermore, the pole segments 70 are preferably not connected to the shaft assembly (not shown) by electrically conductive material (e.g., a metal coupler directly engaging both the pole segments and the shaft).

In a preferred embodiment, the retention structure 20 comprises a synthetic resin material. It is permissible according to some aspects of the present invention for part or all of the retention structure to instead comprise an alternative at least substantially magnetically insulative material. Yet further, a portion of the retention structure that does not engage the pole segments and/or the magnets and is sufficiently isolated therefrom might alternatively be formed of a magnetically conductive material. For instance, the retention structure might include electrically insulative overmolding adjacent the rotor core and a radially inner metallic hub connecting the shaft (not shown).

All in all, any one or more of a variety of materials capable of enabling the features and qualities described herein (e.g., magnetic shielding capability, structural rigidity, etc.) may be used to form the retention structure without departing from some aspects of the present invention.

Preferably, however, the retention structure 20 comprises a body 108 overmolded over at least portions of the pole segments 70, the connecting element 72, the links 74, and the magnets 18 so as to secure the pole segments 70 relative to each other, the magnets 18 relative to each other, and the pole segments 70 and magnets 18 relative to each other, while also increasing structural rigidity of the rotor core 16 as a whole.

Such body 108 preferably is formed of a magnetically insulative material (e.g., a plastic) that is an least somewhat flowable (or at least malleable) composition capable of being molded into a rigid, self-sustaining body providing the necessary retention capabilities described above. The compositions for overmolding according to the invention will generally include a synthetic resin, such as an organic polymeric or oligomeric resin that is capable of hardening or crosslinking during the overmolding process. In many instances, the composition will also include a crosslinking agent and/or a catalyst to initiate crosslinking, since a thermosetting plastic is typically preferred.

As noted previously, the rotor laminations 80 are preferably individually punched from a steel sheet (not shown), then stacked axially to form the rotor core 16 as a whole. The magnets 18 are then inserted into their positions between adjacent pole segments 70. The retention structure 20 is then overmolded over the rotor core 16 and magnets 18 using any appropriate technique known in the art (e.g., injection molding, etc.).

More particularly, a plurality of inner spaces 110 are defined by the connecting element 72, the pole segments 70, and the magnets 18. A plurality of outer slots 112 are defined by the links 74, the pole segments 70, and the magnets 18. The overmolding preferably extends into and at least substantially fills each of the inner spaces 110. The overmolding may additionally fill or partially fill the outer slots 112, although a preferred non-filled embodiment is shown. The overmolding may additionally fill or partially fill any spaces between the magnet side faces 96 and the corresponding pole segment side walls 86. Again, however, a preferred non-filled embodiment is shown.

Furthermore, as alluded to above, it is permissible according to some aspects of the present invention for the overmolding to extend inwardly past the connecting element to a hub (not shown) for the shaft (not shown), etc. Likewise, the overmolding might in fact extend about the outside of the rotor core so as to present a circumferentially outermost face of the rotor as a whole.

Preferably, the retention structure 20 is configured in such a manner that the rotor 12 may be magnetized after assembly. However, pre-assembly magnetization is permissible.

The retention structure 20 may also be configured such that the rotor 12 may be balanced after assembly.

Cooling of the motor 10 may be by any means known in the art. For instance, forced air cooling might be provided, and/or the motor 10 might be associated with a shell or housing defining a heat sink.

As noted previously, the motor 10 most preferably weighs about four hundred eighty (480) g.

The stator core 22 preferably has a weight between about one hundred (100) g and about three hundred (300) g. More preferably, the stator core 22 weighs between about one hundred fifty (150) g and about two hundred fifty (250) g. Most preferably, the stator core 22 weighs about one hundred ninety-one (191) g.

The rotor core 16 preferably has a weight between about fifty (50) g and about two hundred fifty (250) g. More preferably, the rotor core 16 weighs between about one hundred (100) g and about two hundred (200) g. Most preferably, the rotor core 16 weighs about one hundred twenty-seven (127) g.

The magnets 18 preferably have a weight between about twenty (20) g and about one hundred (100) g. More preferably, the magnets 18 weigh between about forty (40) g and about eighty (80) g. Most preferably, the magnets 18 weigh about sixty (60) g.

The wiring 27 preferably has a weight between about fifty (50) g and about one hundred fifty (150) g. More preferably, the wiring 27 weighs between about seventy-five (75) g and about one hundred twenty-five (125) g. Most preferably, the wiring 27 weighs about ninety-two (92) g.

The bobbins 24 preferably have a weight between about five (5) g and about twenty (20) g. More preferably, the bobbins 24 weigh between about ten (10) g and about fifteen (15) g. Most preferably, the bobbins 24 weigh about twelve (12) g.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention set forth in the following claims.

What is claimed is:

1. A motor comprising:
   a stator; and
   a rotor rotatable about an axis, said rotor including—
   a core including a plurality of pole segments arranged arcuately about the axis,
   a plurality of arcuately arranged magnets alternating arcuately with said pole segments, such that each of the magnets is at least in part interposed between a pair of adjacent pole segments,
   said plurality of pole segments including a plurality of first-polarity pole segments having a first polarity and a plurality of second-polarity pole segments having a second polarity that is different than the first polarity, and
   a connecting element connecting at least some of said first-polarity pole segments to one another without connecting said second-polarity pole segments to said first-polarity pole segments,
   each of said first-polarity pole segments having a first shape and each of said second-polarity segments having a second shape different than the first shape,
   said second-polarity pole segments being positioning pole segments, wherein said second shape consists essentially of said first shape plus a shape defined by magnet-positioning structure.

2. The motor of claim 1,
   said plurality of pole segments consisting of said plurality of first-polarity pole segments and said plurality of second-polarity pole segments,
   said core being devoid of any additional pole segments.

3. The motor of claim 1,
   said connecting element connecting all of said first-polarity pole segments to one another.

4. The motor of claim 1,
   said connecting element including a *nexus* and a plurality of bridges,
   said bridges connecting at least a subset of said first-polarity pole segments to said *nexus*.

5. The motor of claim 4,
   each of said bridges connecting a corresponding one of said first-polarity pole segments to said *nexus*.

6. The motor of claim 5,
   each of said first-polarity pole segments being connected to the *nexus* by a corresponding one of the bridges.

7. The motor of claim 4,
   said *nexus* comprising continuously annularly extending structure.

8. The motor of claim 7,
   each of said bridges extending at least substantially radially between a corresponding one of said first-polarity pole segments and said *nexus*.

9. The motor of claim 4,
   each of said first-polarity pole segments presenting a minimum generally arcuate first-polarity pole segment width,
   each of said bridges presenting a maximum generally arcuate bridge width,
   said bridge width being between about 15% and about 50% of said first-polarity pole segment width.

10. The motor of claim 9,
    said bridge width being between about 30% and about 35% of said first-polarity pole segment width.

11. The motor of claim 9,
    said *nexus* presenting a generally radial thickness that is at least substantially equal to said bridge width.

12. The motor of claim 1,
    said connecting element being axially continuous.

13. The motor of claim 1, said core integrally defining the connecting element.

14. The motor of claim 13,
    said core comprising a plurality of stacked laminations,
    said laminations cooperatively defining the plurality of pole segments and the connecting element.

15. The motor of claim 1,
    said connecting element being disposed radially inside said plurality of pole segments.

16. The motor of claim 1,
    said core further including a plurality of links spaced from the connecting element and connecting adjacent ones of the plurality of pole segments.

17. The motor of claim 16,
    said plurality of pole segments cooperatively presenting a radially inner margin and a radially outer margin,
    said connecting element and said links being disposed adjacent opposite ones of said inner and outer margins.

18. The motor of claim 17,
    said connecting element being disposed adjacent the inner margin,
    said links being disposed adjacent the outer margin.

19. The motor of claim 16,
    each of said links connecting one of said first-polarity pole segments and one of said second-polarity pole segments to each other.

20. The motor of claim 1,
    said first-polarity pole segments alternating arcuately with said second-polarity pole segments, such that each of the first-polarity pole segments is at least in part interposed between a pair of adjacent second-polarity pole segments.

21. The motor of claim 1,
    said stator including a stator core and a plurality of pre-wound coil assemblies mounted to the stator core,
    said stator core including a plurality of arcuately arranged teeth defining a plurality of arcuately arranged slots therebetween,
    each of said coil assemblies comprising a bobbin and a coil wound about said bobbin,
    each of said bobbins at least in part encircling a corresponding one of said teeth.

22. The motor of claim 21,
    each of said bobbins including a sleeve defining a rectangularly cuboidal opening,
    each of said teeth having a rectangularly cuboidal shape and extending into a corresponding one of the openings such that a corresponding one of the sleeves overlies the corresponding one of the teeth.

23. The motor of claim 21,
    each of said bobbins including a flange extending from the sleeve,
    each of said flanges presenting arcuately spaced apart first and second circumferential margins,
    each of said first margins being disposed immediately adjacent a second margin of an adjacent one of the flanges,
    each of said second margins being disposed immediately adjacent a first margin of an oppositely adjacent one of the flanges.

24. The motor of claim 21,
said coils filling less than about 50% of each corresponding one of the slots.

25. The motor of claim 24,
said coils filling between about 30% and about 35% of each corresponding one of the slots.

26. The motor of claim 1,
said magnet-positioning structure including a pair of magnet-positioning tabs,
said tabs of each pair at least in part restricting radial displacement of a corresponding pair of the magnets.

27. The motor of claim 26, said tabs of each pair being arcuately spaced apart and oppositely circumferentially outwardly projecting.

28. A motor comprising:
a stator; and
a rotor rotatable about an axis, said rotor including—
  a core including a plurality of pole segments arranged arcuately about the axis,
  a plurality of arcuately arranged magnets alternating arcuately with said pole segments, such that each of the magnets is at least in part interposed between a pair of adjacent pole segments,
  said plurality of pole segments including a plurality of first-polarity pole segments having a first polarity and a plurality of second-polarity pole segments having a second polarity that is different than the first polarity, and
  a connecting element connecting at least some of said first-polarity pole segments to one another without connecting said second-polarity pole segments to said first-polarity pole segments,
  said connecting element including a *nexus* and a plurality of bridges,
  said bridges connecting at least a subset of said first-polarity pole segments to said *nexus*,
  each of said first-polarity pole segments presenting a generally arcuate minimum first-polarity pole segment width,
  each of said bridges presenting a generally arcuate maximum bridge width,
  said maximum bridge width being between about 15% and about 50% of said minimum first-polarity pole segment width.

29. The motor of claim 28,
said maximum bridge width being between about 30% and about 35% of said minimum first-polarity pole segment width.

30. The motor of claim 28,
said *nexus* presenting a generally radial thickness that is at least substantially equal to said maximum bridge width.

* * * * *